United States Patent
Boss et al.

(10) Patent No.: US 7,234,767 B2
(45) Date of Patent: Jun. 26, 2007

(54) SLIDING ROOF SYSTEM

(75) Inventors: Christoph Boss, Frankfurt am Main (DE); Holger Oechel, Frankfurt (DE); Oliver Parendier, Erlensee (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/214,638

(22) Filed: Aug. 30, 2005

(65) Prior Publication Data

US 2006/0049671 A1    Mar. 9, 2006

(30) Foreign Application Priority Data

Sep. 3, 2004   (DE) ...................... 10 2004 042 810

(51) Int. Cl.
*B60J 7/22*       (2006.01)

(52) U.S. Cl. ..................................... 296/217

(58) Field of Classification Search ................. 296/217
See application file for complete search history.

(56) References Cited

U.S. PATENT DOCUMENTS

| 4,798,410 | A | * | 1/1989 | Weller et al. ................ 296/217 |
| 4,966,409 | A | * | 10/1990 | Schmidhuber et al. ...... 296/213 |
| 5,484,184 | A | * | 1/1996 | Kohlpaintner et al. ...... 296/217 |
| 6,030,031 | A | * | 2/2000 | Martinus Lenkens ....... 296/217 |
| 6,457,769 | B2 | * | 10/2002 | Hertel et al. ................. 296/217 |
| 6,779,837 | B1 | * | 8/2004 | Cooney et al. ............. 296/217 |

* cited by examiner

*Primary Examiner*—Dennis H. Pedder
(74) *Attorney, Agent, or Firm*—Carlson Gaskey & Olds

(57) ABSTRACT

A sliding roof system includes a frame, a cover movable into a ventilation position, and a lateral safety screen. When the lateral safety screen is in a covering position, the lateral safety screen extends to lie to a side of and underneath the cover. The lateral safety screen is attached to the frame.

11 Claims, 7 Drawing Sheets

SLIDING ROOF SYSTEM

The application claims priority to German Application No. DE 10 2004 042 810.7, which as filed on Sep. 3, 2004.

BACKGROUND OF THE INVENTION

The invention relates to a sliding roof system comprising a frame, a cover that can be moved into a ventilation position, and a lateral safety screen which in a covering position extends underneath the cover.

With known sliding roof systems a cover can expose a roof opening, fully or partially, due to being movably mounted on a guide rail provided on side edges of the roof opening that form part of the frame. Further, a ventilation position can be established by raising a rear end of the cover.

A body part of a vehicle occupant could become pinched as a gap between the cover and the roof decreases in size as the cover moves to a closed position. This could occur for instance if the vehicle occupant puts a hand on an edge of the roof opening in order to get refreshed by a flow of fresh air. In order to prevent this from occurring, pinch protection devices are installed in known sliding roof systems, which identify jammed objects and halt closing movement of the cover. These pinch protection devices traditionally operate with the aid of measuring current in a drive motor of the cover, by measuring rotational speed of an armature, or by switching mats or safety contact strips, for example.

Devices in the form of safety screens are also known, which cover a gap between a wind deflector and the guide rail at a front edge of the roof opening, and which provide a safe pinch protection when the cover is closed starting from a partially or fully open position. These known devices, however, only exhibit a limited effectiveness when the cover is closed starting from the ventilation position. Due to leverage existing in this situation, known pinch protection devices do not always respond as desired.

This is why some sliding roof systems include a safety screen that makes a lateral gap between the cover and roof inaccessible. From DE 34 42 616 A1 there is known a strip-shaped safety screen and from DE 33 08 065 A1 there is known a safety screen shaped like a concertina. Both of these safety screens are firmly coupled with the cover and thus can only be used with sliding/tilting roofs in which the cover moves under a firm roof sheet during retraction, and cannot be used with spoiler roofs in which the cover moves above the firm roof sheet.

It is therefore the objective of the invention to provide a sliding roof system that ensures a pinch protection when the cover is closed starting from the ventilation position, and which can be employed with a spoiler roof.

SUMMARY OF THE INVENTION

In order to meet this objective, the subject invention provides a sliding roof system with a movable cover in which a lateral safety screen is attached to a frame. In this way the lateral safety screen essentially remains stationary during opening of the cover. As the lateral safety screen is not fixedly attached to the cover, but only rests thereon, the lateral safety screen can release the latter, thus allowing the cover to make a motion above a vehicle roof. The advantage achieved with the invention is in particular that the sliding roof system can also be used with spoiler roofs, because there is no firm coupling between the lateral safety screen and roof, thus resulting in only the cover moving backwards above a roof skin.

The cover is preferably movable between a closed position, the ventilation position, and an open position. The lateral safety screen is preferably shifted between a lowered position, a covering position that the lateral safety screen takes when the cover is in the ventilation position, and a release position that the lateral safety screen takes when the cover is in the open position. The sliding roof system also preferably has a wind deflector that can be shifted between a lowered position and a lifted position. As the lateral safety screen in the open position of the cover takes the release position, the lateral safety screen is not exposed to the wind flow and an undesirable side noise will not occur during driving. In addition, the lateral safety screen can not be seen in the release position.

According to the preferred embodiment, the lateral safety screen is coupled to the wind deflector with a slotted piece guide. The wind deflector, as well as the lateral safety screen, rest against the cover. The wind deflector and lateral safety screen are passively moved depending on the shifting of the cover. Due to the wind deflector and lateral safety screen being coupled, only the cover has to be mechanically controlled. This reduces costs and space requirements.

In one example, the lateral safety screen and the wind deflector are preferably moved by springs. The springs bias the lateral safety screen and the wind deflector into a raised and lifted position, respectively, which the spring and lateral safety screen reach depending on the position of the cover. This provides a low constructional expenditure.

These and other features of the present invention can be best understood from the following specification and drawings, the following of which is a brief description.

DETAILED DESCRIPTION OF THE PREFERRED EMBODIMENT

Figure 1:
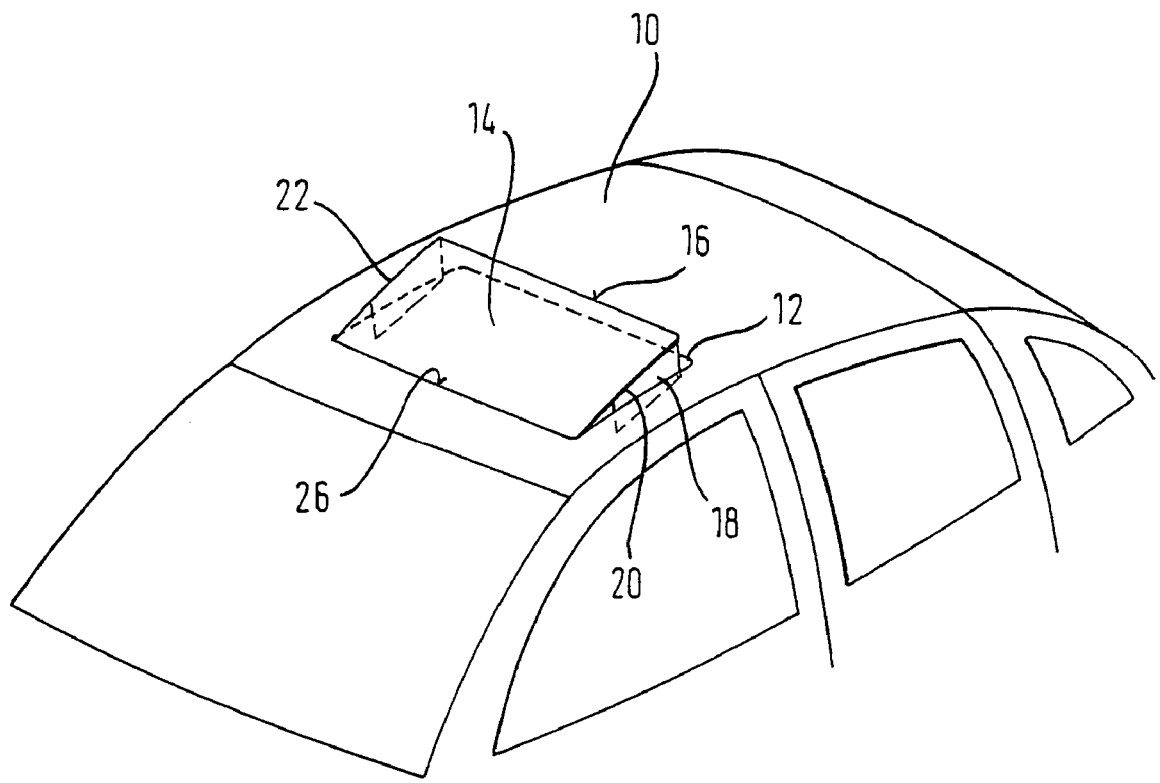
FIG. 1 schematically shows a vehicle roof with a sliding roof system according to the invention, with a cover shown in a ventilation position.

FIG. 1 shows a vehicle roof 10 including a sliding roof system. The sliding roof system has a roof opening 12 within a rigid roof part.

The roof opening 12 can be partially or fully exposed by a cover 14 that is movable along a longitudinal direction of a vehicle. The cover 14 further can be raised into a ventilation position by lifting a rear edge 16 of cover 14. A lateral safety screen 18 is arranged underneath the cover 14 and extends, with the cover 14 being in the ventilation position, on lateral edges 20, 22 of the cover 14 in a downward direction, thus covering a gap between the cover 14 and a guide rail 28. Guide rails 28 are an important component of a frame that interconnects components of the sliding roof system and, for instance, may include a drive motor, a water drain groove etc.

Figure 2:
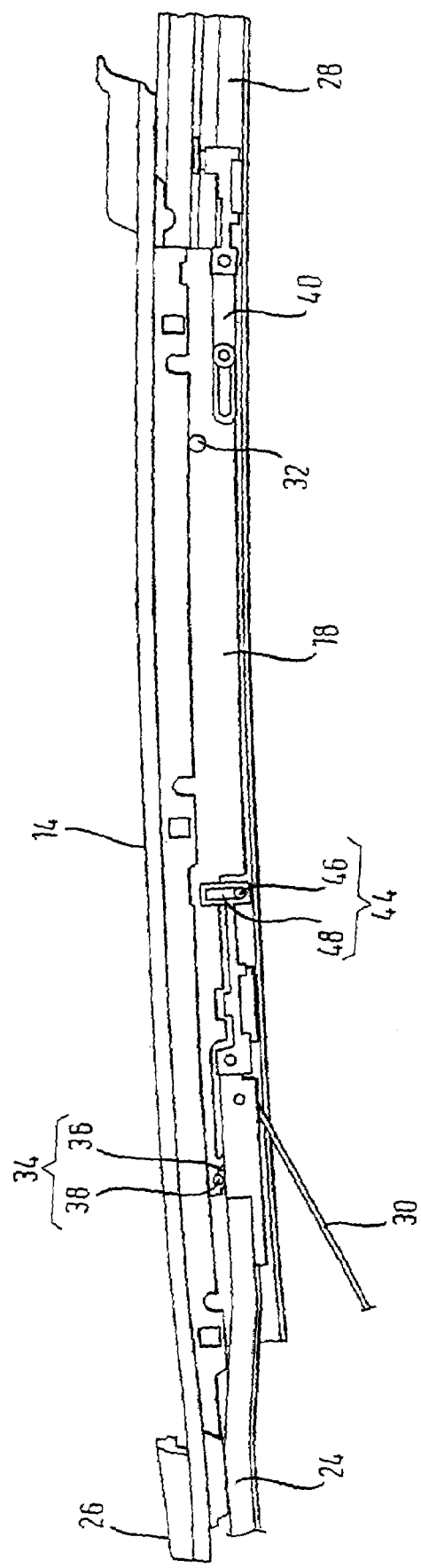
FIG. 2 is a side view of the sliding roof system with the cover in a closed position.
Figure 4:
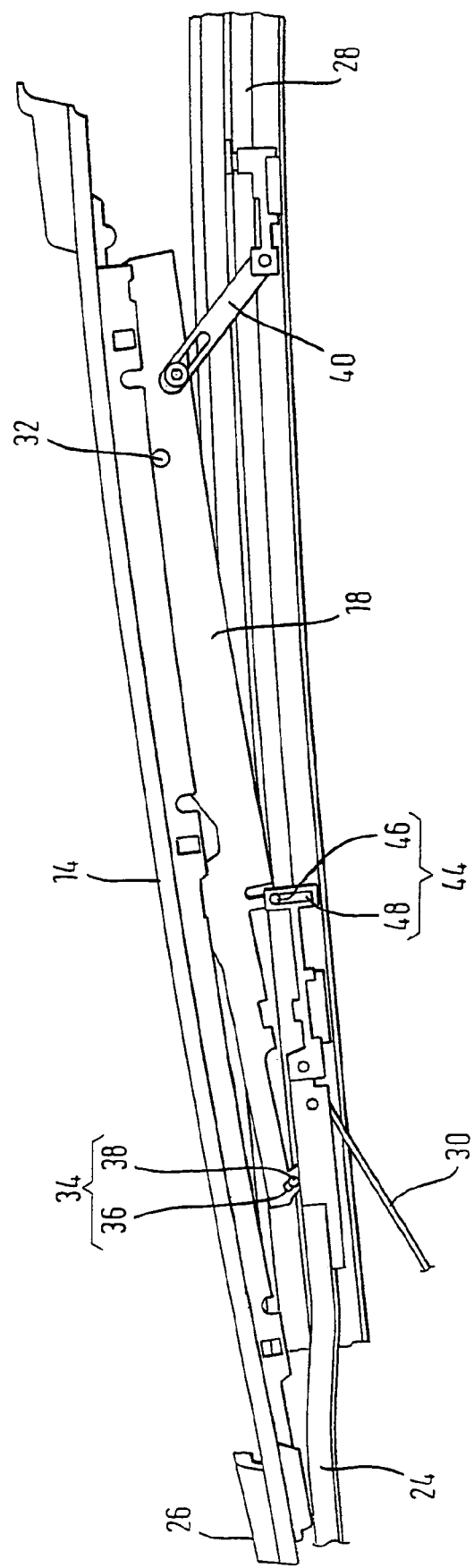
FIG. 4 is a side view of the sliding roof system with the cover in the ventilation position.

A wind deflector 24 is disposed on a front edge 26 of the roof opening 12 (see in particular FIGS. 2 and 4). The wind deflector 24 is a U-shaped and rigid element and, in the region of the lateral edges 20, 22, is pivotally fastened to a bearing point (not shown) on the guide rail 28. A wind deflector spring 30, coupled to the wind deflector 24, is adapted to bias the latter into the lifted position. The wind deflector 24 improves the flow conditions whenever the movable cover 14 of the sliding roof system is in an at least partially open position.

The lateral safety screen 18 preferably is an element made from plastic. The lateral safety screen 18 has a front end coupled to the wind deflector 24 with a slotted piece guide 34. In this arrangement, the lateral safety screen 18 has a guiding slot 36, while the wind deflector 24 has a guide pin 38. The slotted piece guide 34, formed by the guiding slot 36 and the guide pin 38, couples the wind deflector 24 and the lateral safety screen 18 for limited motion (see in particular FIGS. 3 and 5).

The lateral safety screen 18 is pivotally coupled at a rear end to the guide rail 28 by a raising lever 40. A raising spring 42, which for example is a leg spring, is coupled to the raising lever 40. The raising spring 42 is capable of biasing the lateral safety screen 18 upwardly towards a top into a covering position.

Figure 6:
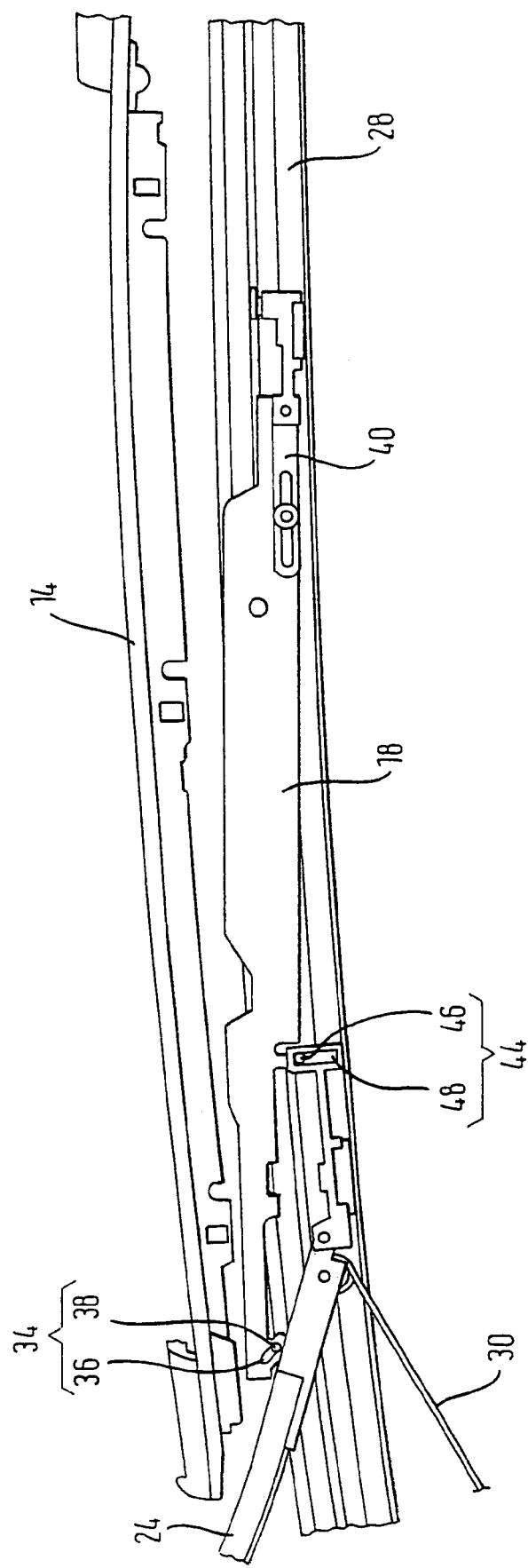
FIG. 6 is a side view of the sliding roof system with the cover in an open position.

At a location between the slotted piece guide 34 and the raising lever 40, the lateral safety screen 18 is further coupled to the guide rail 28 with an abutment 44 (see in particular FIG. 6). The abutment 44 consists of an abutment stud 46 mounted to the lateral safety screen 18, and of an elongated hole 48 arranged on the guide rail 28. The elongated hole 48 permits a vertical motion of the abutment stud 46.

A stop 32 is arranged on the lateral safety screen 18 in the vicinity of the raising lever 40. The function of the stop 32 will be explained below.

Figure 3:
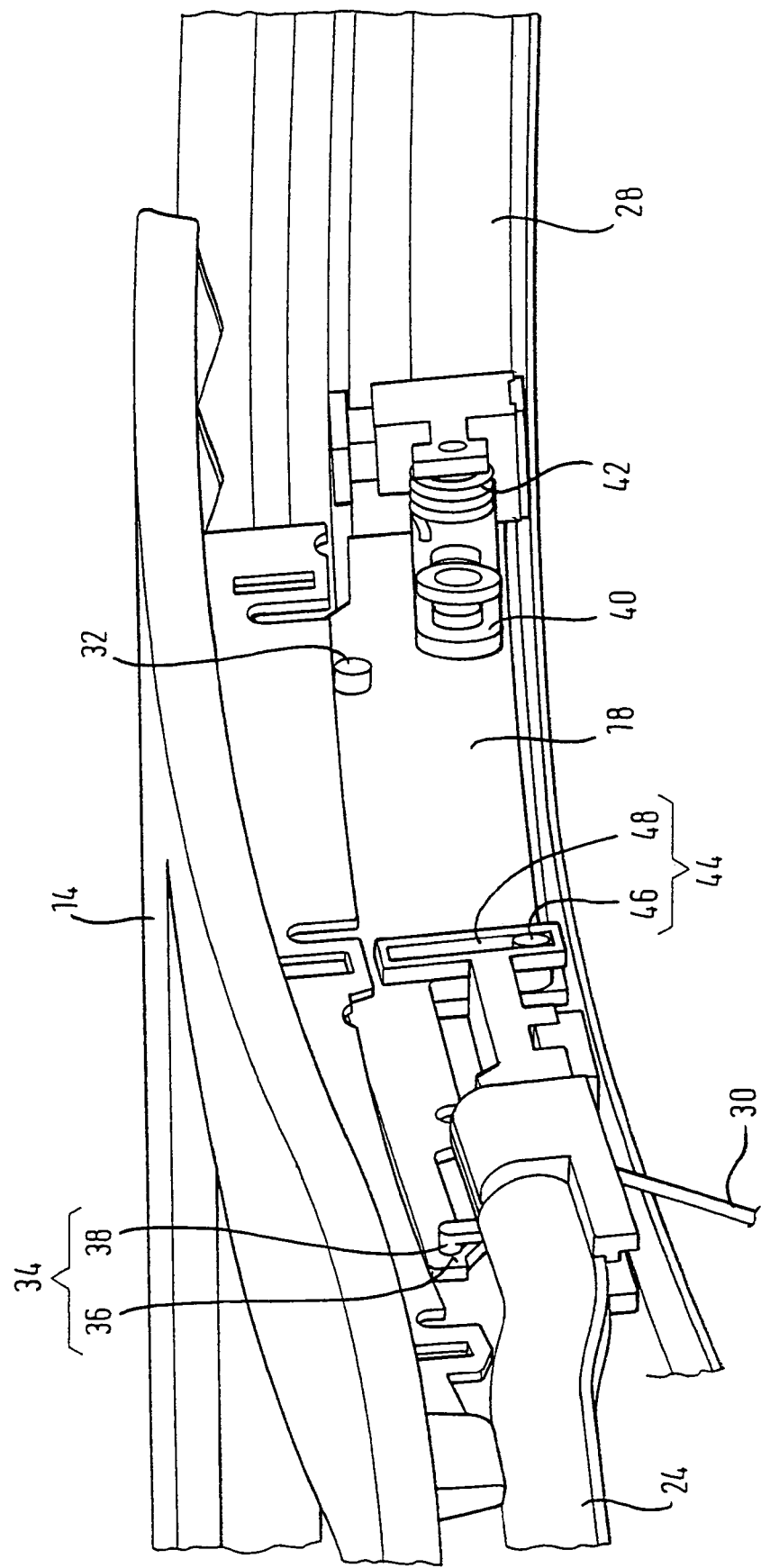
FIG. 3 is a perspective view of the sliding roof system with the cover in the closed position.

FIGS. 2 and 3 show the sliding roof system with the cover 14 in the closed position. The stop 32 rests against the cover 14. This maintains the rear edge of the lateral safety screen 18 in the lowered position, contrary to the effect of the raising spring 42. A front portion of the cover 14 holds the wind deflector 24 in the lowered position, contrary to the effect of the wind deflector spring 30. Due to the coupling via the slotted piece guide 34, the front portion of the lateral safety screen 18 is held in a lowered position, too.

Figure 5:
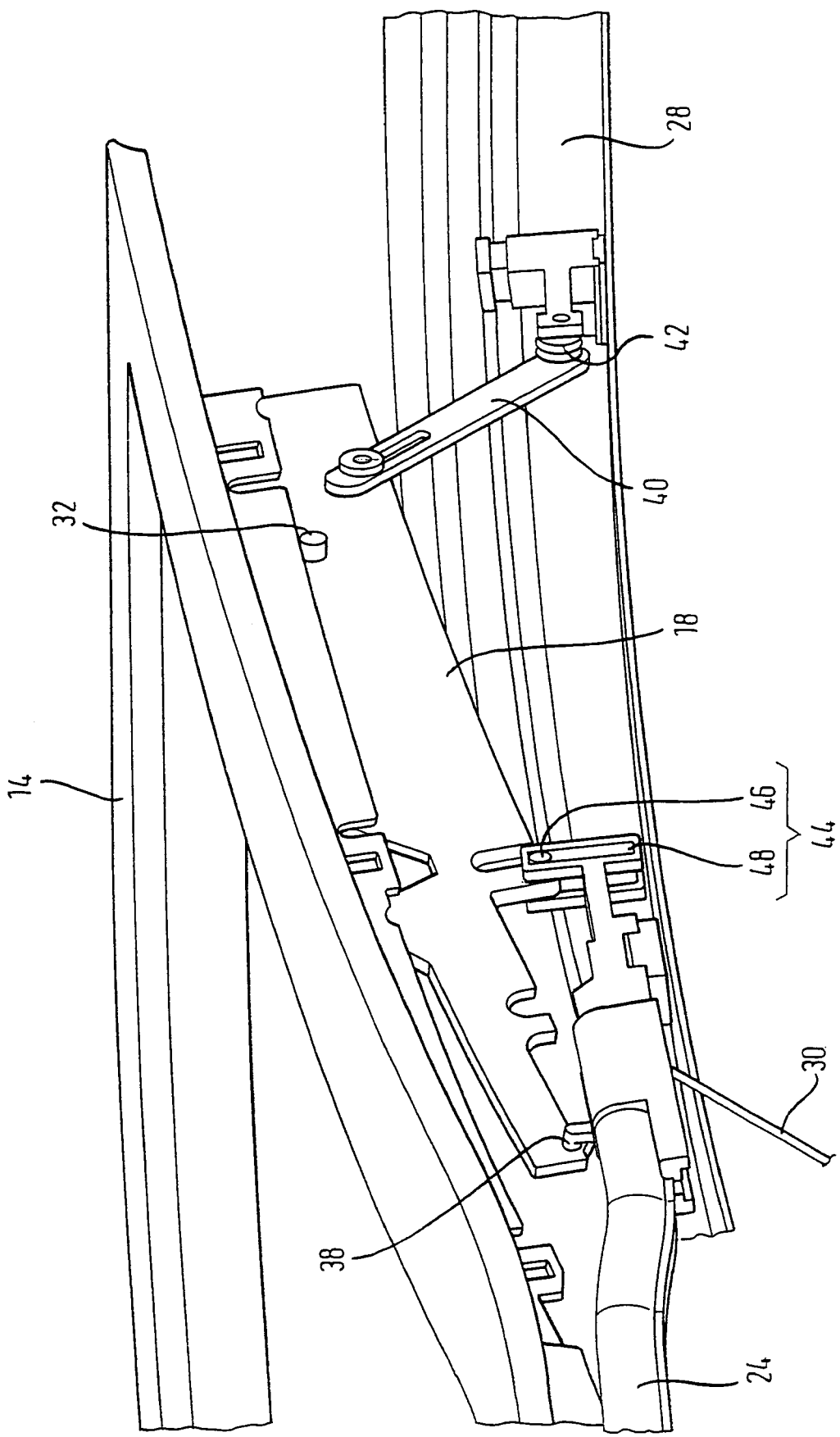
FIG. 5 is a perspective view of the sliding roof system with the cover in the ventilation position.

FIGS. 4 and 5 show the cover in the ventilation position. The raising of the cover 14 is effected by motor power and is known. In the ventilation position, the front edge 26 of the cover 14 is in an unlifted position. Thereby the front edge 26 of the cover 14 continues to hold the wind deflector 24 in the lowered position, and the front portion of the lateral safety screen 18 is held in the lowered position, too.

As the rear edge 16 of the cover 14 is lifted in order to arrive at the ventilation position, the stop 32 on the lateral safety screen 18 likewise is able to move upwards. The raising lever 40, which is coupled with the preloaded raising spring 42, moves the rear portion of the lateral safety screen 18 upwardly into the covering position shown in FIGS. 4 and 5. Hence, the lateral safety screen 18 follows the cover 14 into the ventilation position, with the stop 32 continuing to rest against the cover 14. Through the motion into the covering position the abutment stud 46 of the abutment 44 is moved upwards in the elongated hole 48 provided on the guide rail 28.

Figure 7:
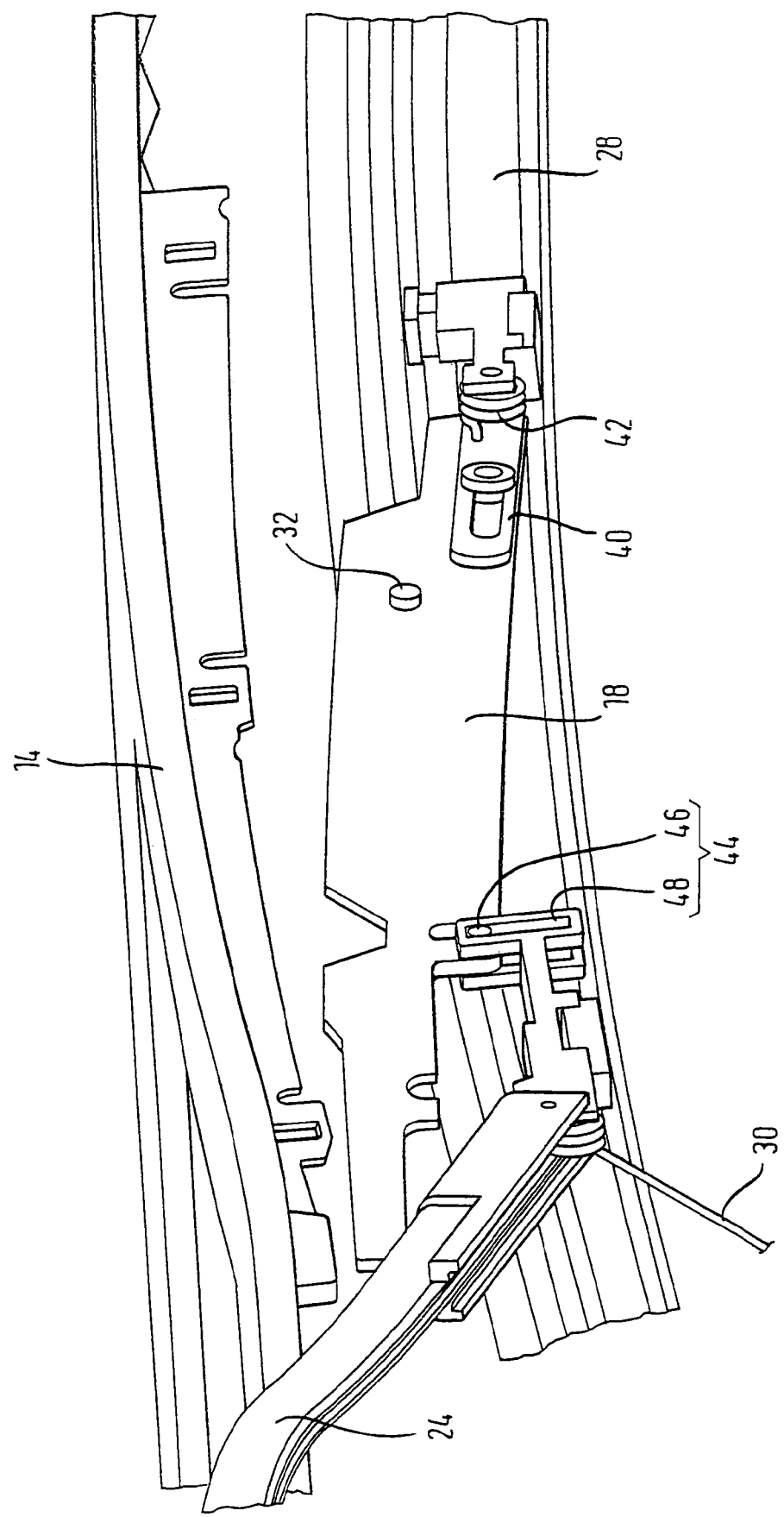
FIG. 7 shows a perspective view of the sliding roof system with the cover in the open position.

FIGS. 6 and 7 show the sliding roof system with the cover 14 in an open position. As a result of moving the cover 14 to the rear, the wind deflector 24 is released, and can be moved upwards by the preloaded wind deflector spring 30. In the process, the front portion of the lateral safety screen 18 is entrained in an upward direction, due to the coupling via the slotted piece guide 34. Together with the guiding slot 36, the guide pin 38 provides the required longitudinal compensation. As the abutment stud 46 already rests against an upper end of the elongated hole 48 when the wind deflector is raised, the lateral safety screen 18 has been swiveled about the abutment stud 46 in a clockwise direction. Thereby the rear portion of the lateral safety screen 18 is moved downwards contrary to the effect of the raising spring 42, so that the lateral safety screen 18 now takes a release position shown in FIGS. 6 and 7. In the release position, the lateral safety screen 18 can not be seen from outside the vehicle, as the lateral safety screen is located between the guide rail 28 and an internal seal (not shown). Furthermore, the lateral safety screen 18 does not bring about any bothersome side noise due to wind flow.

In order to re-establish the initial position according to FIG. 2, the cover 14 is brought into the closed position. In so doing, the cover 14 urges the wind deflector 24 in a downward direction and preloads the wind deflector spring 30, the abutment stud 46 is pressed downwards in the elongated hole 48, and the guide pin 38 moves in the guiding slot 36. So the wind deflector 24 and the lateral safety screen 18 are again in the lowered position, with the lateral safety screen 18 having effectively covered the gap between the cover 14 and the guide rail 28 during movement of the cover 14 from the ventilation position to the closed position, ensuring a safe pinch protection.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system comprising:
   a frame;
   a cover that is movable between a closed position, a ventilation position, and an open position;
   a lateral safety screen that is positionable in a covering position to extend to lie to a side of and underneath the cover, wherein the lateral safety screen is attached to the frame, and wherein the lateral safety screen is shiftable between a lowered position, the covering position which is taken by the lateral safety screen when the cover is in the ventilation position, and a release position that the lateral safety screen takes when the cover is in the open position; and
   a wind deflector that is shiftable between a lowered position and a lifted position wherein the lateral safety screen is coupled with the wind deflector by a slotted piece guide.

2. The sliding roof system according to claim 1 wherein the slotted piece guide comprises a guide pin on the wind deflector and a guiding slot on the lateral safety screen.

3. The sliding roof system according to claim 1 wherein the wind deflector is biased into the lifted position by a wind deflector spring.

4. The sliding roof system according to claim 1 wherein at an end of the lateral safety screen that faces away from the wind deflector, the lateral safety screen includes a stop that can come into contact with the cover.

5. The sliding roof system according to claim 4 wherein a raising spring biases the end of the lateral safety screen that includes the stop, towards the cover.

6. A sliding roof system comprising:
   a frame;
   a cover that is movable between a closed position, a ventilation position and an open position;
   a lateral safety screen that is positionable in a covering position to extend to lie to a side of and underneath the cover wherein the lateral safety screen is attached to the frame, and wherein the lateral safety screen is shiftable between a lowered position the covering position which is taken by the lateral safety screen when the cover is in the ventilation position, and a release position that the lateral safety screen takes when the cover is in the open position;
   a wind deflector that is shiftable between a lowered position and a lifted position wherein at an end of the lateral safety screen that faces away from the wind deflector, the lateral safety screen includes a stop that can come into contact with the cover; and
   a raising spring that biases the end of the lateral safety screen that includes the stop, towards the cover, wherein the raising spring acts on a raising lever that is coupled with the lateral safety screen.

7. The sliding roof system according to claim 5 wherein the raising spring is a leg spring.

8. The sliding roof system according to claim 6 wherein the raising lever is pivotally mounted to a guide rail.

9. The sliding roof system according to claim 1 wherein at an end of the lateral safety screen that faces away from the wind deflector, the lateral safety screen includes a stop that can come into contact with the cover, and wherein between the slotted piece guide and the stop is an abutment that couples the lateral safety screen with a guide rail.

10. The sliding roof system according to claim 9 wherein the abutment pivotally receives the lateral safety screen such that the lateral safety screen is able to move to a limited extent.

11. The sliding roof system according to claim 9 wherein the abutment is formed by an abutment stud on the lateral safety screen and an elongated hole on the guide rail.

* * * * *